United States Patent
Aimura et al.

(10) Patent No.: US 8,994,824 B2
(45) Date of Patent: Mar. 31, 2015

(54) VEHICLE PERIPHERY MONITORING DEVICE

(75) Inventors: Makoto Aimura, Saitama (JP); Nobuharu Nagaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 13/515,618

(22) PCT Filed: Dec. 16, 2010

(86) PCT No.: PCT/JP2010/072647
§ 371 (c)(1),
(2), (4) Date: Jun. 13, 2012

(87) PCT Pub. No.: WO2011/086807
PCT Pub. Date: Jul. 21, 2011

(65) Prior Publication Data
US 2012/0300076 A1 Nov. 29, 2012

(30) Foreign Application Priority Data

Jan. 14, 2010 (JP) .................................. 2010-005905

(51) Int. Cl.
*H04N 7/18* (2006.01)
*B60R 1/00* (2006.01)
(Continued)

(52) U.S. Cl.
CPC .. *H04N 7/18* (2013.01); *B60R 1/00* (2013.01); *B60R 2300/103* (2013.01);
(Continued)

(58) Field of Classification Search
CPC ..... B60R 1/00; B60R 2300/105; H04N 7/181

USPC ......................................................... 348/148
See application file for complete search history.

(56) References Cited

U.S. PATENT DOCUMENTS 6,285,393 B1 9/2001 Shimoura et al.
7,899,213 B2 3/2011 Otsuka et al.

FOREIGN PATENT DOCUMENTS

JP 06-235635 A 8/1994
JP 06-333049 A 12/1994
(Continued)

OTHER PUBLICATIONS

Marinus Bastiaan Van Leeuwen: "Motion Estimation and Interpretation for In-Car Systems", May 22, 2002, this work was carried out in graduate school ASCI. ASCI dissertation series No. 77, pp. 1-144.

*Primary Examiner* — Chikaodili E Anyikire
(74) *Attorney, Agent, or Firm* — Carrier Blackman & Associates, P.C.; Joseph P. Carrier; Jeffrey T. Gedeon

(57) ABSTRACT

A vehicle periphery monitoring device is provided with a symmetrical image portion extraction unit (21) which extracts a first image portion (A1) and a second image portion (A2) which are line-symmetrical to each other in the horizontal direction; and expanded region setting unit (22) which sets a first expanded region (B1) containing the first image portion (A1); an expanded search range setting unit (23) which sets an expanded search range (C) which contains the second image portion (A2); and an object class recognition unit (24) which searches in the expanded search range (C) a second expanded region (B2) which has a correlation degree to a mirror reflection image (B1m) of the first expanded region (B1), and recognizes the image containing the first image portion (A1) and the second image portion (A2) as the image of another vehicle if the second expanded region (B2) is detected.

9 Claims, 8 Drawing Sheets

(51) Int. Cl.
   *G06K 9/00*   (2006.01)
   *G08G 1/16*   (2006.01)
(52) U.S. Cl.
   CPC .... *B60R 2300/107* (2013.01); *B60R 2300/205* (2013.01); *B60R 2300/301* (2013.01); *B60R 2300/302* (2013.01); *B60R 2300/307* (2013.01); *G08G 1/16* (2013.01); *G06K 9/00805* (2013.01); *G06K 9/00825* (2013.01)
   USPC ......................................... 348/148; 348/142

(56) References Cited

FOREIGN PATENT DOCUMENTS

| | | |
|---|---|---|
| JP | 07-078258 A | 3/1995 |
| JP | 2002-358595 A | 12/2002 |
| JP | 2005-092857 A | 4/2005 |
| JP | 2006-285549 A | 10/2006 |
| JP | 3839329 B2 | 11/2006 |
| JP | 2009-230530 A | 10/2009 |
| JP | 2009-265882 A | 11/2009 |

FIG.7 (a)
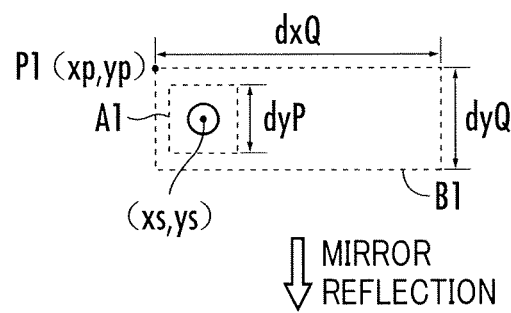
⇓ MIRROR REFLECTION
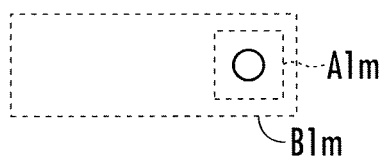
FIG.7 (b)
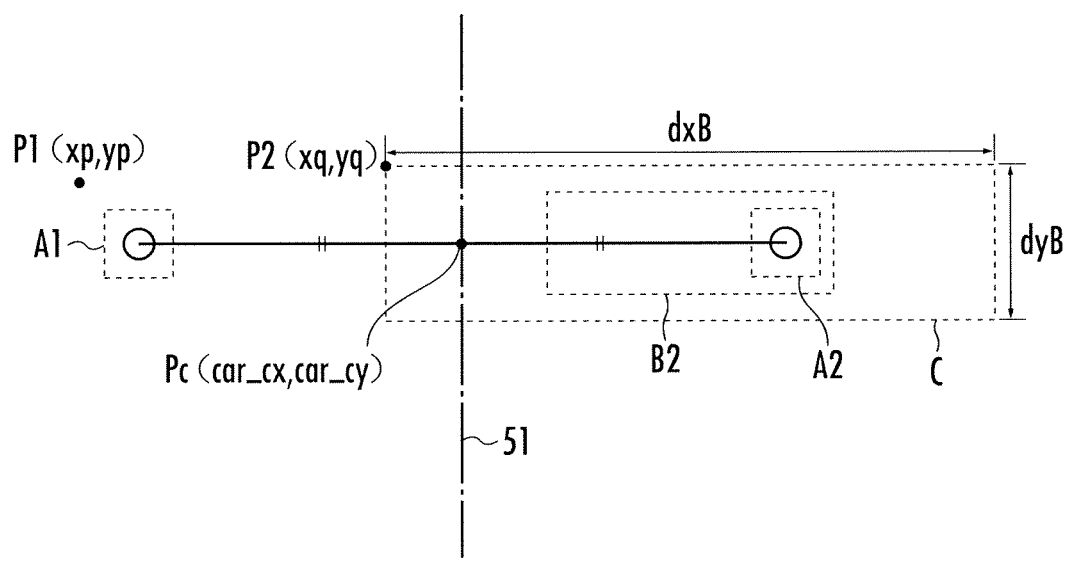

VEHICLE PERIPHERY MONITORING DEVICE

TECHNICAL FIELD

The present invention relates to a vehicle periphery monitoring device configured to recognize a monitoring object in the periphery of a vehicle on the basis of a captured image by a camera mounted in the vehicle.

BACKGROUND ART

Hitherto, there has been disclosed a vehicle periphery monitoring device configured to detect a monitoring object, such as a pedestrian or the like, which has potential to come into contact with a self vehicle on the basis of a periphery image of a self vehicle captured by a camera (for example, refer to Patent Document 1).

In order to identify and extract an image portion of a pedestrian and an image portion of another vehicle from the captured image by an infrared camera, the vehicle periphery monitoring device disclosed in Patent Document 1 recognizes an image region containing a pair of image portions as the image region of another vehicle on condition that the pair of image portions have the same distance to the self vehicle, the amount of infrared rays thereof is not greater than a predefined value, and the pair of image portions are present at symmetrical positions.

PRIOR ART REFERENCES

Patent Documents

Patent document 1: Japanese Patent No. 3839329

SUMMARY OF THE INVENTION

Problems to be Solved by the Invention

According to the vehicle periphery monitoring device disclosed in Patent Document 1, in order to calculate the distance from the self vehicle to a monitoring object, it is required to have a stereo camera or a distance measuring device such as a radar or the like equipped. Moreover, if the detection error on the distance from the self vehicle to the monitoring object is greater, it brings about a problem that the recognition accuracy of another vehicle becomes lower.

It is therefore an object of the present invention to provide a vehicle periphery monitoring device capable of recognizing with a good accuracy an image of another vehicle without the necessity of using the information on a distance from the self vehicle to a monitoring object.

Means for Solving the Problems

The present invention has been accomplished to attain an object described above. The present invention relates to a vehicle periphery monitoring device configured to recognize a monitoring object in the periphery of a self vehicle on the basis of a captured image by a vehicular camera.

A first aspect of the present invention is provided with a light image portion extraction unit configured to extract a first image portion having a feature quantity of a light of a vehicle from the captured image; an expanded region setting unit configured to set a region which has a predefined size and contains the first image portion as a first expanded region; and an object class recognition unit configured to determine whether or not the first expanded region has a bilateral symmetry in the horizontal direction with the first image portion as the central point, and recognize an image containing the first image portion as the image of another vehicle when the first expanded region is determined to have a bilateral symmetry.

In general, the portion surrounding the left or right light (headlight, taillight) of a vehicle is designed to be symmetrical. Therefore, according to the determination of whether or not the first expanded region containing the first image portion having a feature quantity of a light of the vehicle, which is extracted by the light image portion extraction unit, has a bilateral symmetry in the horizontal direction with the first image portion in the center by the object class recognition unit, it is possible to recognize with a good accuracy whether the monitoring object is a vehicle or not.

A second aspect of the present invention is provided with a symmetrical image portion extraction unit configured to extract from the captured image a first image portion and a second portion which are line-symmetrical to each other in the horizontal direction; an expanded region setting unit configured to set a region which has a predefined size and contains the first image portion as a first expanded region; an expanded search range setting unit configured to set a range which is wider than the size of the first expanded region and contains the second image portion as an expanded search range; and an object class recognition unit configured to search in the expanded search range a second expanded region which has a correlation degree to the first expanded region or a mirror reflection image of the first expanded region not smaller than a predefined level, and recognize an image containing the first image portion and the second image portion as the image of another vehicle when the second expanded region is detected.

According to the invention mentioned above, whether or not an image containing the first image portion and the second image portion is the image of another vehicle is recognized by the object class recognition unit according to whether or not the second expanded region which has a correlation degree to the first expanded region or a mirror reflection image of the first expanded region not smaller than a predefined level is present in the expanded search range. In addition to the symmetry between the first image portion and the second image portion, the correlation degree between the conditions (geometry, dimension, luminosity and the like) of the ambient image around the first image portion and the conditions of the ambient image around the second image portion is determined. If the first image portion and the second image portion are of the image portion of the same vehicle, the correlation degree is high. Therefore, it is possible to recognize with a good accuracy whether or not the monitoring object is another vehicle without the necessity of using the information on a distance from the self vehicle to a monitoring object.

In the second aspect of the present invention, the expanded region setting unit sets the first expanded region in a range to the side of the first image portion with a straight line orthogonal to a line segment joining the first image portion and the second image portion at the midpoint of the line segment as the boundary line, and the expanded search range setting unit sets the expanded search range in the horizontal direction to contain the region from the midpoint up to the second image portion.

When a general vehicle is viewed from the front side or the rear side, a pair of components, such as the headlights, the side mirrors, the taillights and the like, are roughly line-symmetrical to each other with respect to a straight line orthogonal to a line segment joining the pair of components at the midpoint of the line segment. Therefore, the first expanded region is set by the expanded region setting unit in a range to the side of the first image portion with a straight line orthogonal to a line segment joining the first image portion and the second image portion at the midpoint of the line segment as the boundary line, and the expanded search range in the horizontal direction is set by the expanded search range setting unit to contain the midpoint up to the second image portion, it is possible to search the second expanded region efficiently.

In the second aspect of the present invention, the expanded search range setting unit sets the first expanded region on condition that the height thereof to the road surface of a corresponding position in the real space is not smaller than a predefined height.

According to the invention mentioned above, an image of a singular component (a muffler or the like) disposed at a lower portion of another vehicle is prevented from being included in either the first ambient region or the second ambient region; therefore, it is possible to inhibit the correlation degree from decreasing.

In the second aspect of the present invention, a feature portion searching unit configured to search a third image portion having a predefined feature portion pertained to a vehicle in ambient regions around the first image portion and the second image portion is further provided, wherein the object class recognition unit recognizes the image containing the first image portion and the second image portion as the image of another vehicle when the correlation degree between the first expanded region and the second expanded region is not smaller than the predefined level and the third image portion is detected by the feature portion searching unit.

According to the invention mentioned above, it is possible to improve the recognition accuracy of another vehicle by the object class recognition unit when the third image portion is present is taken as the condition.

In the second aspect of the present invention, a singular camera is provided as the vehicular camera, and comprises a distance calculation unit configured to calculate the distance from the self vehicle to the monitoring object on the basis of a dimension variation rate of the captured images of the monitoring object captured by the camera at different time points.

According to the invention mentioned above, the distance from the self vehicle to the monitoring object is calculated by the distance calculation unit from the captured images by the singular camera. However, in case where there is a fear that the accuracy of the distance has decreased, it is still possible for the object class recognition unit to recognize another vehicle without using the distance information.

In the second aspect of the present invention, a singular camera is provided as the vehicular camera and comprises a distance calculation unit configured to calculate the distance from the self vehicle to the monitoring object on the basis of an interval in the horizontal direction between the first image portion and the second image portion in the captured image by the camera.

According to the invention mentioned above, the interval between the first image portion and the second image portion (the interval between the left headlight and the right headlight or the left taillight and the right taillight of a vehicle) is relative to the vehicle width (about 150 cm to 200 cm). As the distance to the self vehicle increases, the interval between the first image portion and the second image portion decreases. Therefore, for example, if the correspondence data between the horizontal image width of a vehicle in a captured image and the real spatial distance is preliminarily prepared on an assumption that the vehicle width is 170 cm, it is possible to calculate the distance to another vehicle from the interval between the first image portion and the second image portion.

In addition, the distance calculation unit is configured to calculate the distance from the self vehicle to the monitoring object on the basis of a dimension variation rate of the captured images of the monitoring object captured by the camera at different time points, and the object class recognition unit recognizes the monitoring object as a mobile object when the difference between a distance obtained on the basis of the interval in the horizontal direction between the first image portion and the second image portion which is calculated by the distance calculation unit for the monitoring object and a distance obtained on the basis of the dimension variation rate of the captured images of the same monitoring object is not smaller than a predefined value.

According to the invention mentioned above, the calculation of the distance on the basis of the dimension variation rate of the captured images of the monitoring object is on a presupposition that the monitoring object is motionless; therefore, when the monitoring object is a mobile object such as a vehicle, the calculation error of the distance will become greater. Thus, the object class recognition unit is configured to recognize the monitoring object as a mobile object on condition that the difference between a distance obtained on the basis of the interval in the horizontal direction between the first image portion and the second image portion which is calculated by the distance calculation unit for the same monitoring object and a distance obtained on the basis of the dimension variation rate of the captured images of the monitoring object is not smaller than a predefined value.

Thus, when the monitoring object has been recognized to be a mobile object, the calculation of the distance on the basis of the dimension variation rate of the captured images of the monitoring object is prohibited so as to prevent the distance having a greater calculation error from being used. When the monitoring object is a mobile object, for example, the monitoring object is certainly not a pedestrian which is regarded as a motionless object; therefore, it can be excluded from the contact determination objects for a pedestrian.

BRIEF DESCRIPTION OF THE DRAWINGS

FIG. 7(a) illustrates the setting a first expanded region containing the first image portion by the expanded region setting unit;

FIG. 7(b) illustrates the first expanded region; and

MODE FOR CARRYING OUT THE INVENTION

Figure 1:
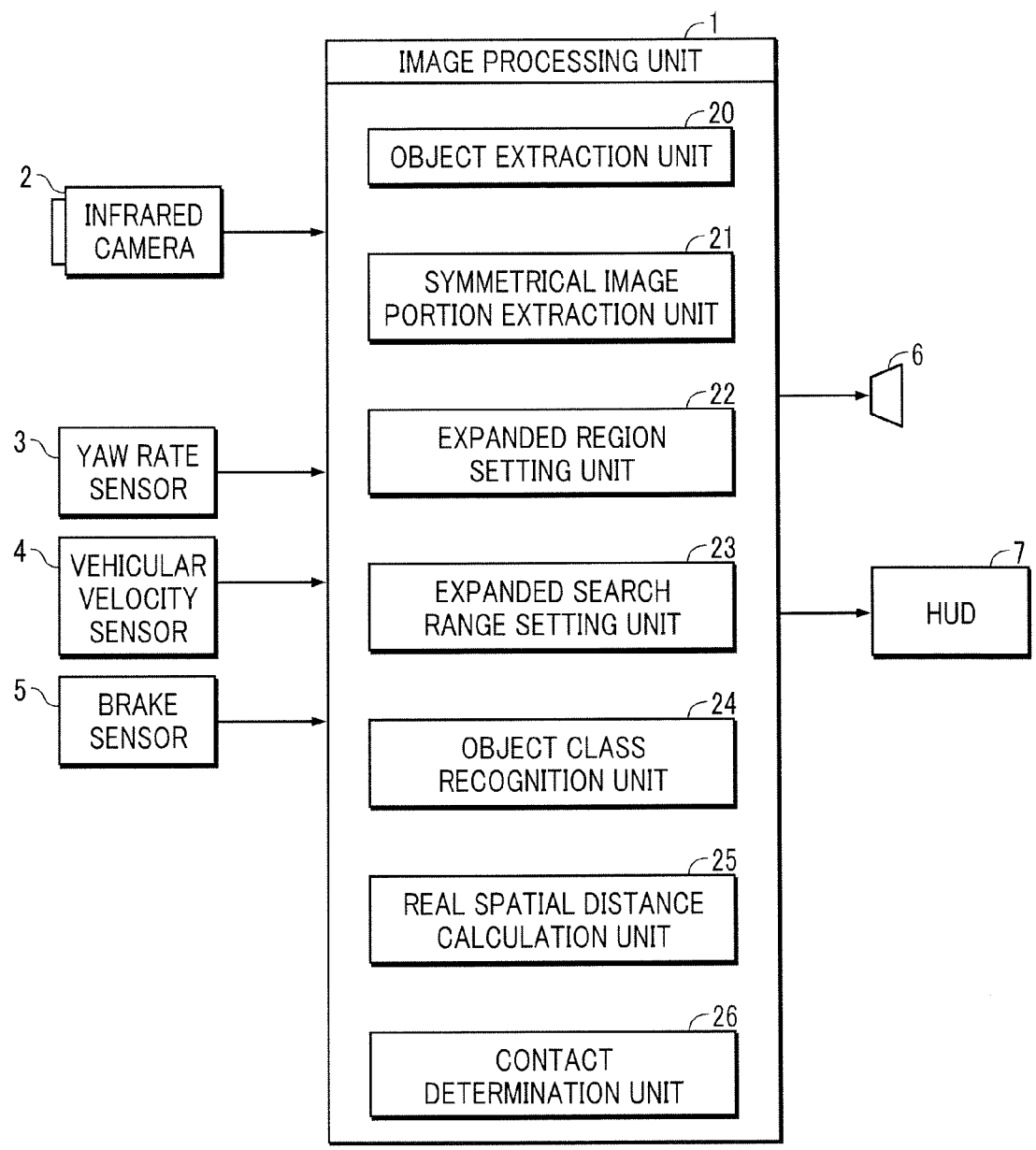
FIG. 1 is a diagram illustrating a configuration of a vehicle periphery monitoring device of the present invention.

Hereinafter, an embodiment of the present invention will be described in detail with reference to FIG. 1 to FIG. 8. With reference to FIG. 1, a vehicle periphery monitoring device of the present invention is provided with a single infrared camera 2 capable of detecting far infrared rays, a yaw rate sensor 3 configured to detect a yaw rate of a vehicle, a vehicular velocity sensor 4 configured to detect a travel velocity of the vehicle, a brake sensor 5 configured to detect a manipulated amount of a brake pedal by a driver, an image processing unit 1 configured to detect a monitoring object in front of the vehicle from a captured image by the infrared camera 2 and output an alarm when the monitoring object has a contact probability to the vehicle, a speaker 6 for outputting a sound alarm, and a head-up display 7 (hereinafter, referred to as HUD 7) for displaying the captured image by the infrared camera 2 and visualizing the monitoring object having a high contact probability to the driver.

Figure 2:
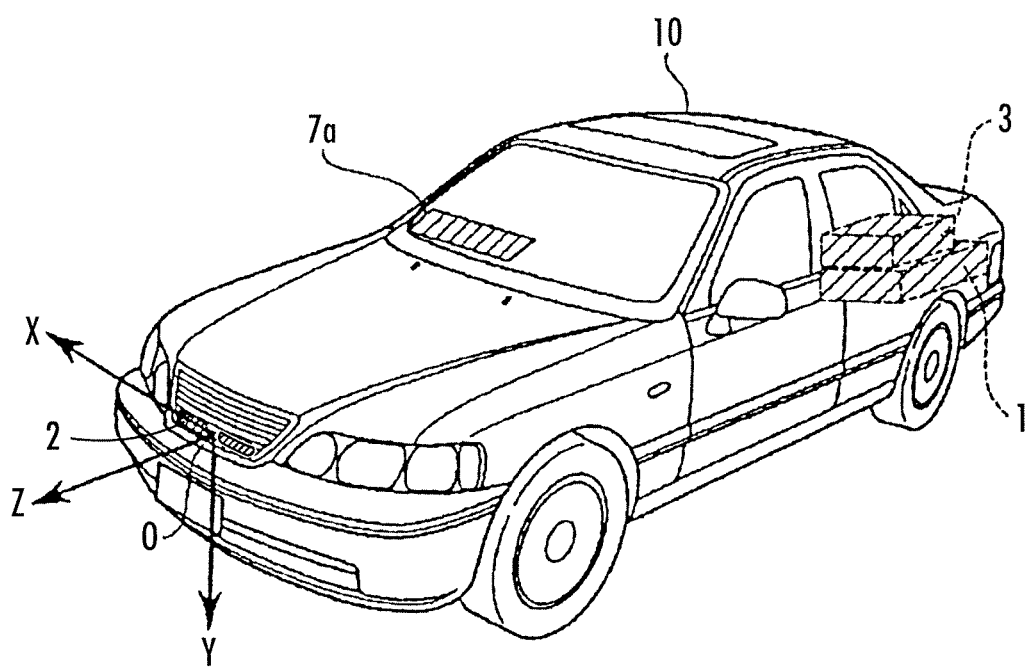
FIG. 2 is a diagram illustrating the installation of the vehicle periphery monitoring device illustrated in FIG. 1 to a vehicle.

With reference to FIG. 2, the infrared camera 2 is disposed in the front portion of the vehicle 10, and possesses a property of outputting image signals with a higher level (the luminance of the image signals becomes greater) as the temperature of an object to be photographed becomes higher. The HUD 7 is disposed so that an image 7a is displayed on the windshield of the vehicle 10 in front of the driver.

The image processing unit 1 has a function of converting analog image signals output from the infrared cameras 2 to digital data, storing the digital data in an image memory (not shown), and performing various arithmetic computations on images in front of the vehicle which are stored in the image memory. With reference to FIG. 1, the image processing unit 1 is disposed with an object extraction unit 20 configured to extract candidates of the image portion of the monitoring object from the images in front of the vehicle which are stored in the image memory, a symmetrical image portion extraction unit 21 configured to extract a first image portion and a second image portion having symmetry in the horizontal direction from the image candidates, and an expanded region setting unit 22 configured to set a first expanded region containing the first image portion.

The image processing unit 1 is further disposed with an expanded search range setting unit 23 configured to set an expanded search range containing the second image portion, an object class recognition unit 24 configured to determine whether or not the image has a symmetry reliability according to the search of a second expanded region which has a correlation degree to a mirror reflection image of the first expanded region not smaller than a predefined level in the expanded search range and to recognize the image having a symmetry reliability as the image of another vehicle, a real spatial position calculation unit 25 configured to calculate the corresponding position of the image in the real space, and a contact determination unit 26 configured to determine the contact probability between the monitoring object and the vehicle 10 (self vehicle).

The image processing unit 1 is an electronic unit composed of a CPU, a memory and the like (not shown). By causing the CPU to execute a vehicle periphery monitoring program, the image processing unit 1 functions as the object extraction unit 20, the symmetrical image portion extraction unit 21, the expanded region setting unit 22, the expanded search range setting unit 23, the object class recognition unit 24, the real spatial position calculation unit 25, and the contact determination unit 26.

The recognition process of recognizing that the monitoring object performed by the image processing unit 1 is another vehicle will be described with reference to the flow chart illustrated in FIG. 3. The image processing unit 1 recognizes another vehicle by performing steps of a preliminary treatment (STEP 100), a symmetrical image portion extraction (STEP 200), a symmetry reliability determination, and a geometry reliability determination.

The preliminary treatment is performed by the object extraction unit 20. The infrared image signals (analog signals) output from the infrared camera 2 are input into the object extraction unit 20, and the object extraction unit 20 converts the analog signals to digitally harmonized data (luminance data) to yield a gray scale image and stores it in an image memory. Thereafter, the image processing unit 1 generates a binary image by performing a binarization processing in which pixels having luminance equal to or greater than a predefined threshold are interpreted as 1 (white), otherwise as 0 (black)) on every pixel in the gray scales image.

Thereafter, the image processing unit 1 extracts a candidate of an image portion corresponding to a specific part (for example, the head of a pedestrian) of the monitoring object from the binary image. Specifically, the image processing unit 1 calculates run-length data of each white region in the binary image, performs a labeling process to label those regions having overlapped portions in the horizontal direction collectively, and extracts a region having a predefined feature quantity (a circular shape or the like) from the labeled regions as the candidate of an image portion corresponding to a specific part of the monitoring object.

FIG. 5(a) illustrates a binary image Im containing the image 30 of another vehicle in which the image portions 31 and 32 corresponding to the headlight portions of another vehicle are extracted as the candidates of the image portions of the monitoring object. Hereinafter, the description will be carried out on the example of recognizing another vehicle contained in the image Im illustrated in FIG. 5(a).

Figure 4:
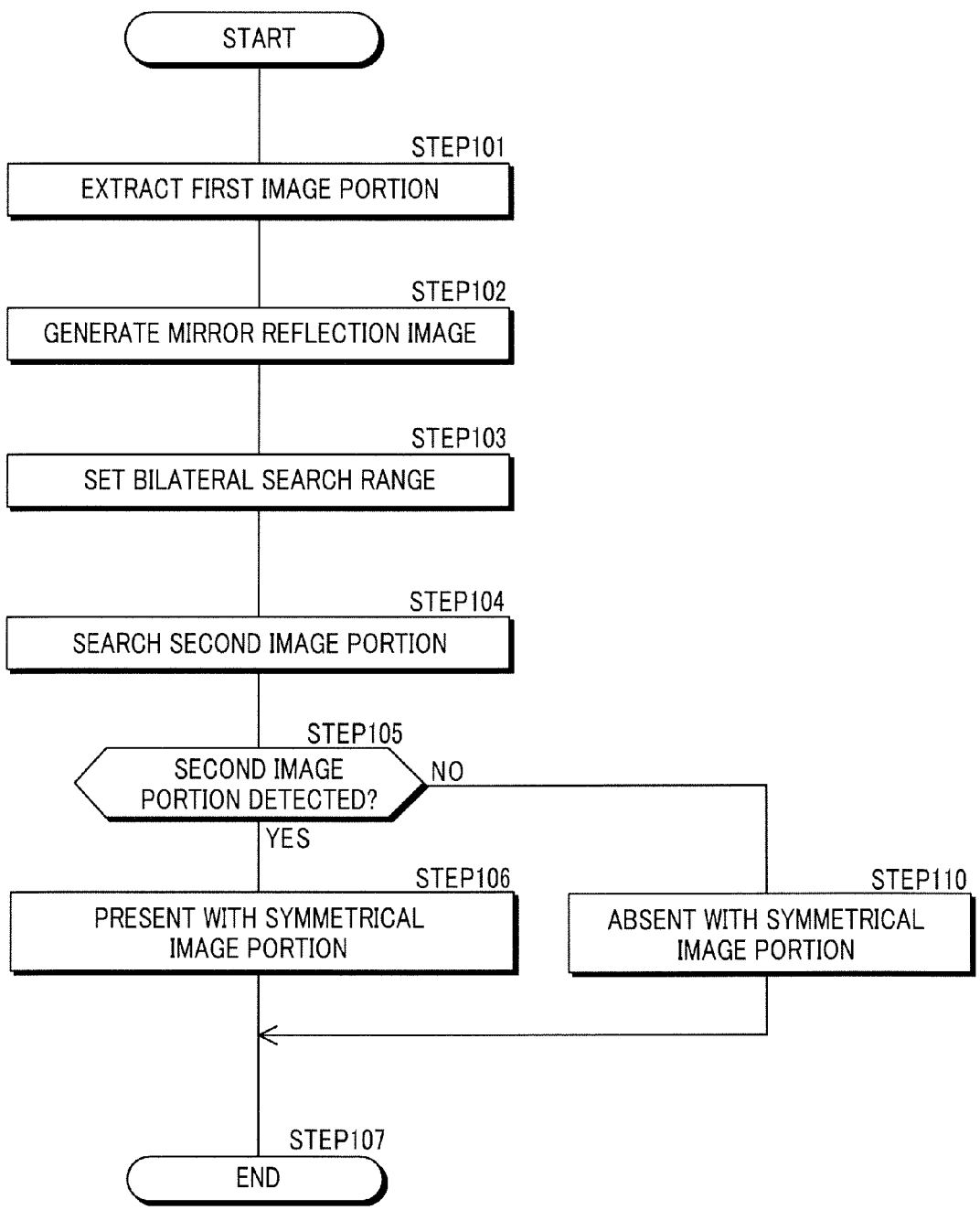
FIG. 4 is a flow chart related to a symmetrical image portion extraction process.
Figure 5:
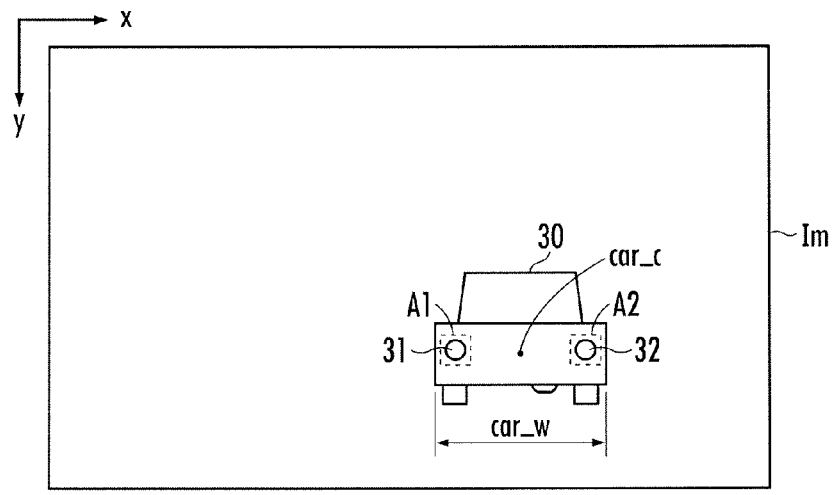
FIG. 5(a) illustrates a binary image containing the image of another vehicle in which the image portions corresponding to the headlight portions of another vehicle are extracted as the candidates of the image portions of the monitoring object.
FIG. 5(b) is an explanatory diagram illustrating the symmetrical image portion extraction process.
Figure 5:
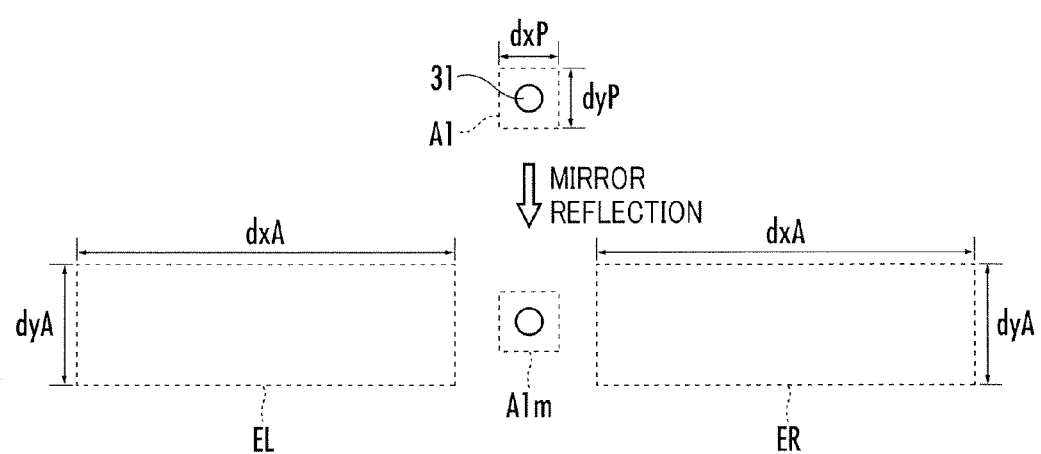

The symmetrical image portion extraction is performed by the symmetrical image portion extraction unit 21 according to the flow chart illustrated in FIG. 4. At STEP 101 in FIG. 4, the symmetrical image portion extraction unit 21 sets a first image portion A1 which contains therein the candidate 31 of the image portion of the monitoring object and has a width dxP in the horizontal direction and a width dyP in the vertical direction, as illustrated in FIG. 5(b).

At the subsequent STEP 102, the symmetrical image portion extraction unit 21 generates a mirror reflection image A1m (a bilaterally reversed image of the first image portion A1 with respect to the orthogonal line passing through the center of the first image portion A1) of the first image portion A1. At the next STEP 103, the symmetrical image portion extraction unit 21 sets a right search range ER which is located right to the first image portion A1 and has a width dxA in the horizontal direction and a width dyA in the vertical direction, and a left search range EL which is located left to the first image portion A1 and has a width dxA in the horizontal direction and a width dyA in the vertical direction.

At the next STEP 104, the symmetrical image portion extraction unit 21 searches a second image portion A2 having a correlation degree not smaller than a predefined level to the mirror reflection image A1m (having a high correlation degree to A1m) in the right search range ER and the left search range EL. In the example of FIG. 5(a), the second image portion A2 containing the image portion 32 of the left headlight of another vehicle is detected.

If the second image portion A2 is detected, the procedure moves from the next STEP 105 to STEP 106, the symmetrical image portion extraction unit 21 determines that the symmetrical portions (the first image portion A1 and the second image portion A2) are present and the procedure moves to STEP 107. In this case, the procedure moves to the symmetry reliability determination of FIG. 3.

On the other hand, if the second image portion A2 is not detected, the procedure branches from STEP 105 to STEP 110, the symmetrical image portion extraction unit 21 determines that the symmetrical portions are absent and the procedure moves to STEP 107. In this case, the symmetry reliability determination and the procedure thereafter will not be performed. In addition, if a candidate of the image portion of another monitoring object is extracted at STEP 100, the process of STEP 200 and thereafter will be performed again for the candidate.

Figure 6:
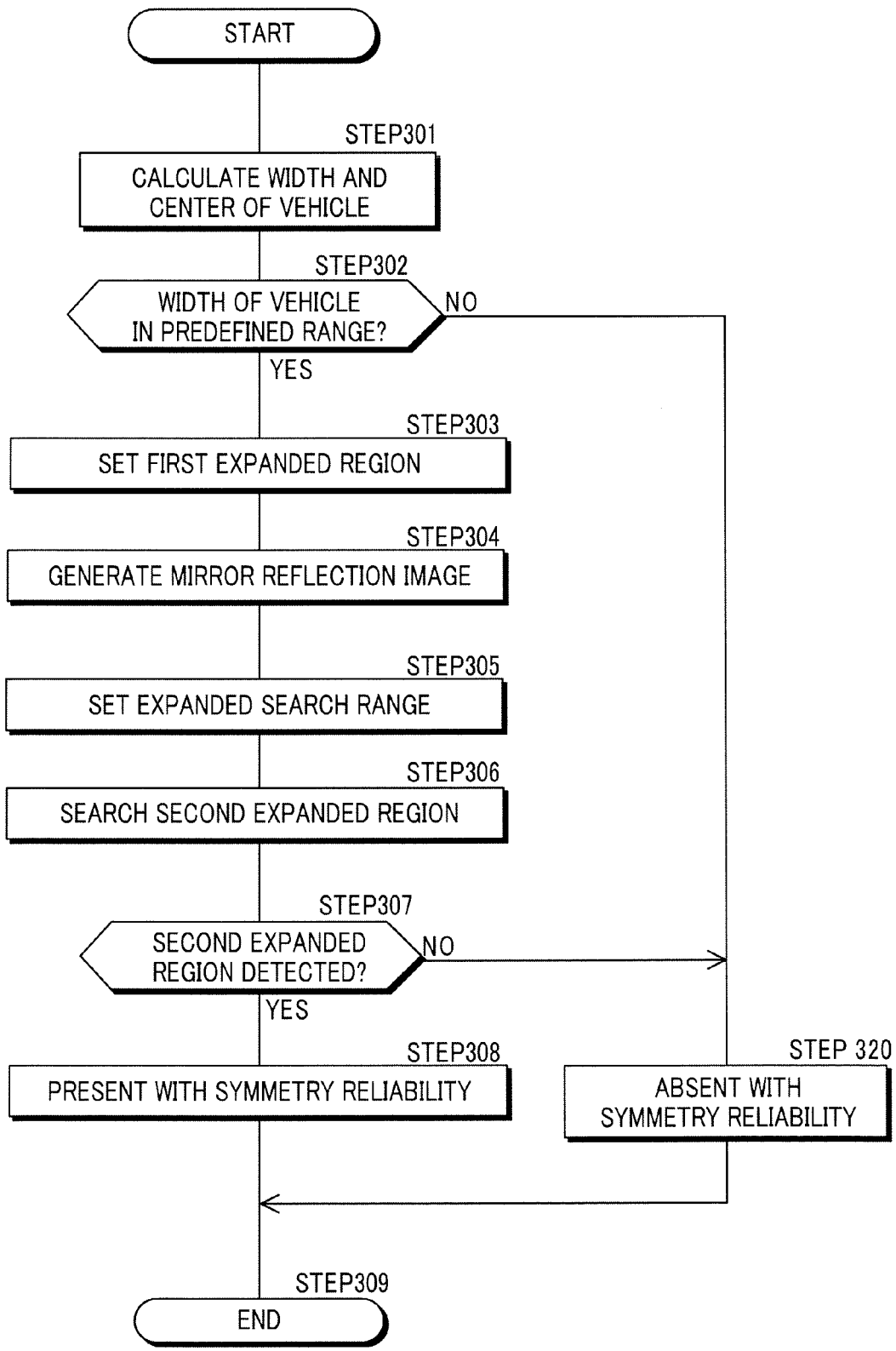
FIG. 6 is a flow chart related to a symmetry reliability determination process.

The symmetry reliability determination is performed by the expanded region setting unit 22, the expanded search range setting unit 23 and the object class recognition unit 24 according to the flow chart illustrated in FIG. 6.

STEP 301 to STEP 304 in FIG. 6 are processed by the expanded region setting unit 22. At STEP 301, the expanded region setting unit 22 calculates the width car_w of the image 30 (estimated from the distance between the first image portion A1 and the second image portion A2) and the center car_c (the midpoint between the first image portion A1 and the second image portion A2) thereof for another vehicle illustrated in FIG. 5(a).

At the subsequent STEP 302, the expanded region setting unit 22 determines whether or not the difference or the ratio between the width car_w of the image 30 and the width dxP of the first image portion A1 in the horizontal direction is in a predefined range set on the assumption of the difference or the ratio between the vehicle width and the interval between the headlights in a common vehicle. If the difference or the ratio between car_w and dxP is beyond the predefined range, the procedure branches to STEP 320.

STEP 320 is processed by the object class recognition unit 24. At STEP 320, the object class recognition unit 24 determines that there is no symmetry reliability between the first image portion A1 and the second image portion A2; therefore, the image 30 is not an image of another vehicle. In this case, the geometry reliability determination of STEP 300 and thereafter in FIG. 3 will not be performed. In addition, if a candidate of the image portion of another monitoring object is extracted in the preliminary treatment of STEP 100, the process of STEP 200 and thereafter will be performed again for the candidate.

On the other hand, if the difference or the ratio between the width car_w of the image 30 and the width dxP of the first image portion A1 in the horizontal direction is determined to be in a predefined range, the procedure moves to STEP 303. STEP 303 and STEP 304 are performed by the expanded region setting unit 22.

At STEP 303, as illustrated in FIG. 7(a), the expanded region setting unit 22 sets a first expanded region B1 containing the first image portion A1. For example, the expanded region setting unit 22 defines the first expanded region B1 to such a dimension that the width dxQ in the horizontal direction to a reference point (xp, yp) (=xs-xmg, ys-ymg) offset from the central position (xs, ys) of the first image portion A1 by a predefined margin (xmg, ymg) is about ½ of car_w and the width dyQ in the vertical direction to the reference point is roughly equal to the height dyP of the first image portion A1 plus 2*ymg. At STEP 304, the expanded region setting unit 22 generates a mirror reflection image B1$m$ of the first expanded region B1.

Therefore, as illustrated in FIG. 7(b), the first expanded region B1 is defined at the side of the first image portion A1 with a straight line 51 orthogonal to a line segment 50 joining the first image portion A1 and the second image portion A2 at the midpoint Pc of the line segment as the boundary line.

The subsequent STEP 305 is processed by the expanded search range setting unit 23. As illustrated in FIG. 7(b), the expanded search range setting unit 23 defines a reference point P2 (xq, yq) (=car_cx–car_w/4, yp-mgp) which is offset from the midpoint Pc (car_cx, car_cy) of the line segment 50 joining the first image portion A1 and the second image portion A2 by a predefined margin (car_w/4) in the horizontal direction and is offset from P1 (xp, yp) by a predefined margin (mgp) in the vertical direction.

Thereafter, the expanded search range setting unit 23 defines an expanded search range C to such a dimension that the width dxB in the horizontal direction to the reference point P2 is about car_w and the width dyB in the vertical direction to the reference point P2 is about dyP plus 2*mgp. The expanded search range C in the horizontal direction is defined to include the midpoint Pc up to the second image portion A2.

STEP 306 to STEP 308 is processed by the object class recognition unit 24. At STEP 306, the object class recognition unit 24 searches in the expanded search range C a second expanded region which has a correlation degree to the mirror reflection image B1$m$ of the first expanded region B1 not smaller than a predefined level. As illustrated in FIG. 7(b), when the second expanded region B2 which has a correlation degree to the mirror reflection image B1$m$ of the first expanded region B1 not smaller than a predefined level is detected, the procedure moves from the next STEP 307 to STEP 308.

Since it has been confirmed that the first expanded region B1 and the second expanded region B2 having extensive symmetry about the straight line 51 exists, the object class recognition unit 24 determines that the image 30 has the symmetry reliability and the procedure moves to STEP 309 where the object reliability determination process is ended. Thereafter, the procedure moves to the geometry reliability determination process at STEP 400 of FIG. 3.

On the other hand, if the mirror reflection image B1$m$ of the first expanded region B1 is not detected in the expanded search range C, the procedure branches from STEP 307 to STEP 320 where the object class recognition unit 24 determines that the image 30 has no symmetry reliability and the image 30 is therefore not an image of another vehicle. In this case, the geometry reliability determination process of FIG. 3 will not be performed. In addition, if a candidate of the image portion of another monitoring object is extracted at STEP 100, the process of STEP 200 and thereafter will be performed again for the candidate.

Figure 3:
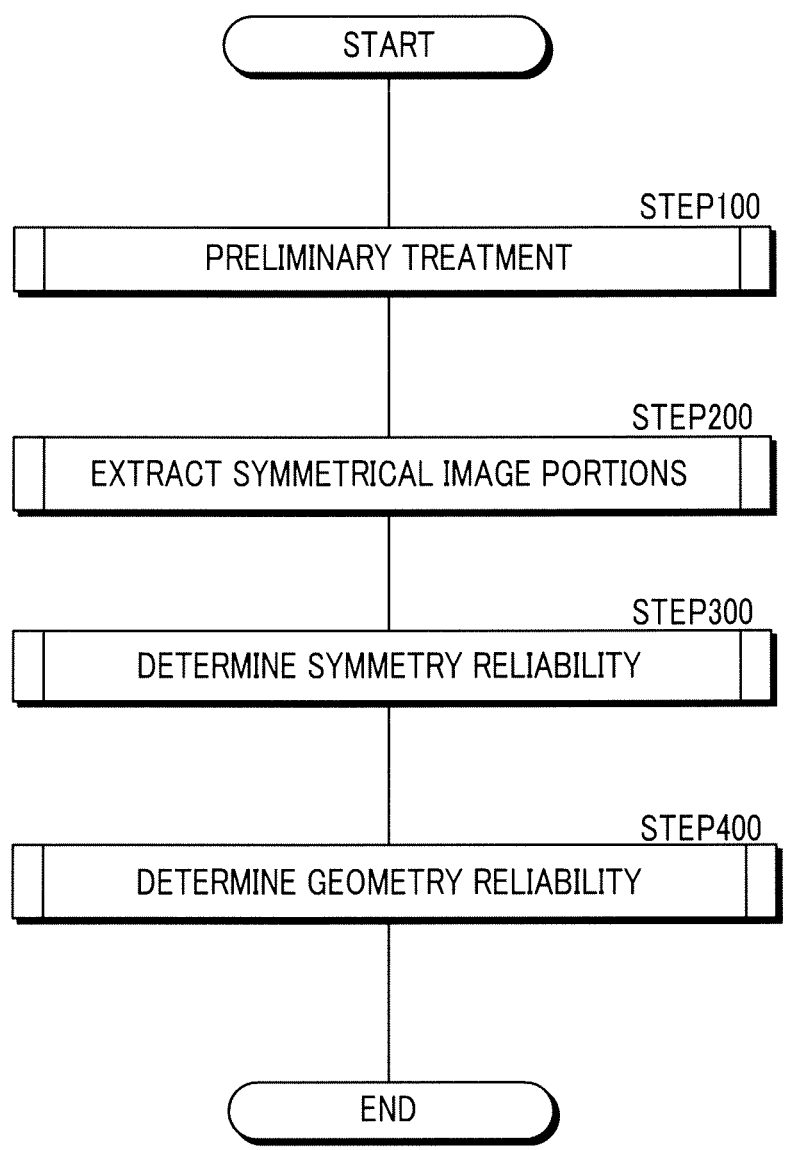
FIG. 3 is a flow chart illustrating a series of processes performed by an image processing unit illustrated in FIG. 1.
Figure 8:
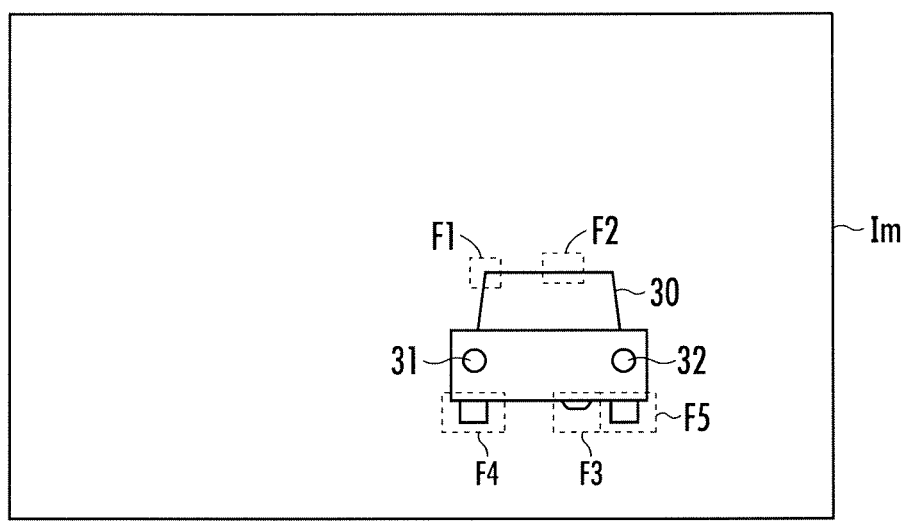
FIG. 8 is an explanatory diagram illustrating a geometry reliability determination process.

The geometry reliability determination at STEP 400 of FIG. 3 is processed by the object class recognition unit 24. As illustrated in FIG. 8, the object class recognition unit 24 determines whether or not a portion having a distinctive feature pertained to a vehicle is present at an upper or lower position to the portion where the symmetry is recognized (the range between the image portions 31 and 32 of both headlights).

For example, the presence of a slope edge of a pillar (F1 in FIG. 8), the presence of a horizontal edge of the roof (F2 in FIG. 8) horizontally-long shape of an exhaust pipe (F3 in FIG. 8), or the presence of two geometrical shapes of the same size of a tire (F4 and F5 in FIG. 8) is determined as a distinctive feature pertained to a vehicle. If a portion having a distinctive feature pertained to a vehicle is present, the object class recognition unit 24 recognizes the image 30 as an image of another vehicle.

As mentioned, if the image 30 is recognized to be an image of another vehicle, the determination of the contact probability to the self vehicle will not be performed by the contact determination unit 26.

In the present embodiment, as illustrated in FIG. 3, the recognition reliability of another vehicle is improved by determining the bilateral (horizontal) symmetry at STEP 200 and 300 and performing the geometry reliability determination at STEP 400 on an image of a monitoring object; however, even without the geometry reliability determination process, it is still possible to obtain the effects of the present invention.

In the present embodiment, the distance calculation unit 25 has been applied to calculate the distance from the self vehicle to the monitoring object from a captured image by a single camera 6; however, it is acceptable that two cameras (stereo cameras) are disposed and the distance from the self vehicle to the monitoring object may be calculated from the paradox difference between the two cameras, it is also acceptable that the distance from the self vehicle to the monitoring object is detected by a distance measuring sensor such as radar or the like.

In the present embodiment, the infrared camera 2 has been used as an example; however, the present invention is applicable even if a visible camera is used.

In the present embodiment, the second expanded region B2 has been searched on a condition that it has a correlation degree to the mirror reflection image B1m of the first expanded region B1 not smaller than a predefined level; however, depending on the geometry of another vehicle and the defined design of the first expanded region B1, it is acceptable to search the second expanded region B2 having a correlation degree to the first expanded region B1 but not the mirror reflection image B1m not smaller than the predefined level.

In the present embodiment, the symmetrical image portion extraction unit 21 is disposed to extract the symmetrical image portions (the first image portion A1 and the second image portion A2); however, it is acceptable that a light image portion extraction unit is disposed to extract the first image portion A1 having a feature of a light (circular shape or the like), the first expanded region containing the first image portion A1 is defined by the expanded region setting unit 22, and whether or not the first expanded region has the bilateral symmetry in the horizontal direction with the first image portion A1 as the central point is determined by the object class recognition unit 24.

Generally, the portion around the left or right headlight or the left or right taillight of a vehicle extracted as the first image portion is designed to be symmetrical. Therefore, if the first expanded region has a bilateral symmetry in the horizontal direction with the first image portion in the center, it is possible to recognize with a good accuracy that the image containing the first image portion is an image of a vehicle.

Further, it is acceptable that the distance from the self vehicle to the monitoring object is calculated by the real spatial distance calculation unit 25 on the basis of an interval in the horizontal direction between the first image portion A1 and the second image portion A2 in the captured image by the infrared camera 2. In this case, for example, if the correspondence map data between the image width (pixels) of a vehicle in a captured image and the distance from the self vehicle 10 to another vehicle is preliminarily stored in memory on an assumption that the width of another vehicle is 170 cm, it is possible to calculate the distance from the self vehicle 10 to another vehicle by using the interval (pixels) between the first image portion and the second image portion in the correspondence map.

It is acceptable that the object class recognition unit 24 determines whether or not the difference between the distance from the self vehicle 10 to another vehicle calculated on the basis of the interval between the first image portion and the second image portion as above-mentioned and the distance from the self vehicle 10 to another vehicle calculated on the basis of the dimension variation rate of the captured images as afore-mentioned is not smaller than a predefined value, and the monitoring object is recognized as a mobile object if the difference is not smaller than the predefined value.

INDUSTRIAL APPLICABILITY

As mentioned in the above, according to the vehicle periphery monitoring device of the present invention, an image of another vehicle can be recognized with a good accuracy without the necessity of using the information on a distance from the self vehicle to a monitoring object; therefore, it is useful in monitoring the periphery of the self vehicle.

DESCRIPTION OF REFERENCE NUMERALS

1: image processing unit; 20: object extraction unit; 21: symmetrical image portion extraction unit; 22: expanded region setting unit; 23: expanded search range setting unit; 24: object class recognition unit; A1: first image portion; A1m: mirror reflection image of the first image portion; A2: second image portion; B1: first expanded region; B2: second expanded region; C: expanded search range.

What is claimed is:

1. A vehicle periphery monitoring device configured to recognize a monitoring object in the periphery of a self vehicle on the basis of a captured image by a vehicular camera, comprising:
  a symmetrical image portion extraction unit configured to extract from the captured image a first image portion and a second image portion which are line-symmetrical to each other in the horizontal direction;
  an expanded region setting unit configured to set a region which has a predefined size and contains the first image portion as a first expanded region;
  an expanded search range setting unit configured to set a region which is wider than the size of the first expanded region and contains the second image portion as an expanded search range; and
  an object class recognition unit configured to search in the expanded search range a second expanded region which has a correlation degree to the first expanded region or a mirror reflection image of the first expanded region not smaller than a predefined level, and recognize an image containing the first image portion and the second image portion as the image of another vehicle when the second expanded region is detected.

2. The vehicle periphery monitoring device according to claim 1, wherein
  the expanded region setting unit sets the first expanded region in a range to the side of the first image portion with a straight line orthogonal to a line segment joining the first image portion and the second image portion at the midpoint of the line segment as the boundary line, and the expanded search range setting unit sets the expanded search range in the horizontal direction to contain the region from the midpoint up to the second image portion.

3. The vehicle periphery monitoring device according to claim 1, wherein
the expanded search range setting unit sets the first expanded region on condition that the height thereof to the road surface of a corresponding position in the real space is not smaller than a predefined height.

4. The vehicle periphery monitoring device according to claim 1 is further comprises a feature portion searching unit configured to search a third image portion having a predefined feature portion pertained to a vehicle in ambient regions around the first image portion and the second image portion,
wherein the object class recognition unit recognizes the image containing the first image portion and the second image portion as the image of another vehicle when the correlation degree between the first expanded region and the second expanded region is not smaller than the predefined level and the third image portion is detected by the feature portion searching unit.

5. The vehicle periphery monitoring device according to claim 1 is provided with a singular camera as the vehicular camera and comprises a distance calculation unit configured to calculate the distance from the self vehicle to the monitoring object on the basis of a dimension variation rate of the captured images of the monitoring object captured by the camera at different time points.

6. The vehicle periphery monitoring device according to claim 1 is provided with a singular camera as the vehicular camera and comprises a distance calculation unit configured to calculate the distance from the self vehicle to the monitoring object on the basis of an interval in the horizontal direction between the first image portion and the second image portion in the captured image by the camera.

7. The vehicle periphery monitoring device according to claim 6, wherein
the distance calculation unit is configured to calculate the distance from the self vehicle to the monitoring object on the basis of a dimension variation rate of the captured images of the monitoring object captured by the camera at different time points, and
the object class recognition unit recognizes the monitoring object as a mobile object when the difference between a distance obtained on the basis of the interval in the horizontal direction between the first image portion and the second image portion which is calculated by the distance calculation unit for the monitoring object and a distance obtained on the basis of the dimension variation rate of the captured images of the same monitoring object is not smaller than a predefined value.

8. The vehicle periphery monitoring device according to claim 1, wherein the symmetrical image portion extraction unit is configured to extract the first image portion and the second image portion having a feature quantity of a light of a vehicle from the captured image.

9. The vehicle periphery monitoring device according to claim 8 is provided with a singular camera as the vehicular camera, and comprises a distance calculation unit configured to calculate the distance from the self vehicle to the monitoring object on the basis of a dimension variation rate of the captured images of the monitoring object captured by the camera at different time points.

* * * * *